Figure 2:
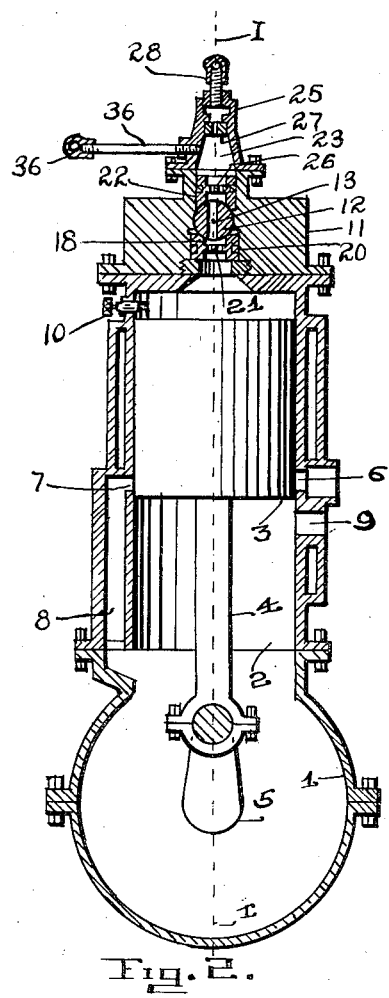

Sept. 24, 1940.          A. C. PETERSON                2,215,911
            FUEL INJECTION AND SPRAYING INTERNAL COMBUSTION ENGINE
                    Filed Feb. 10, 1937          2 Sheets-Sheet 1
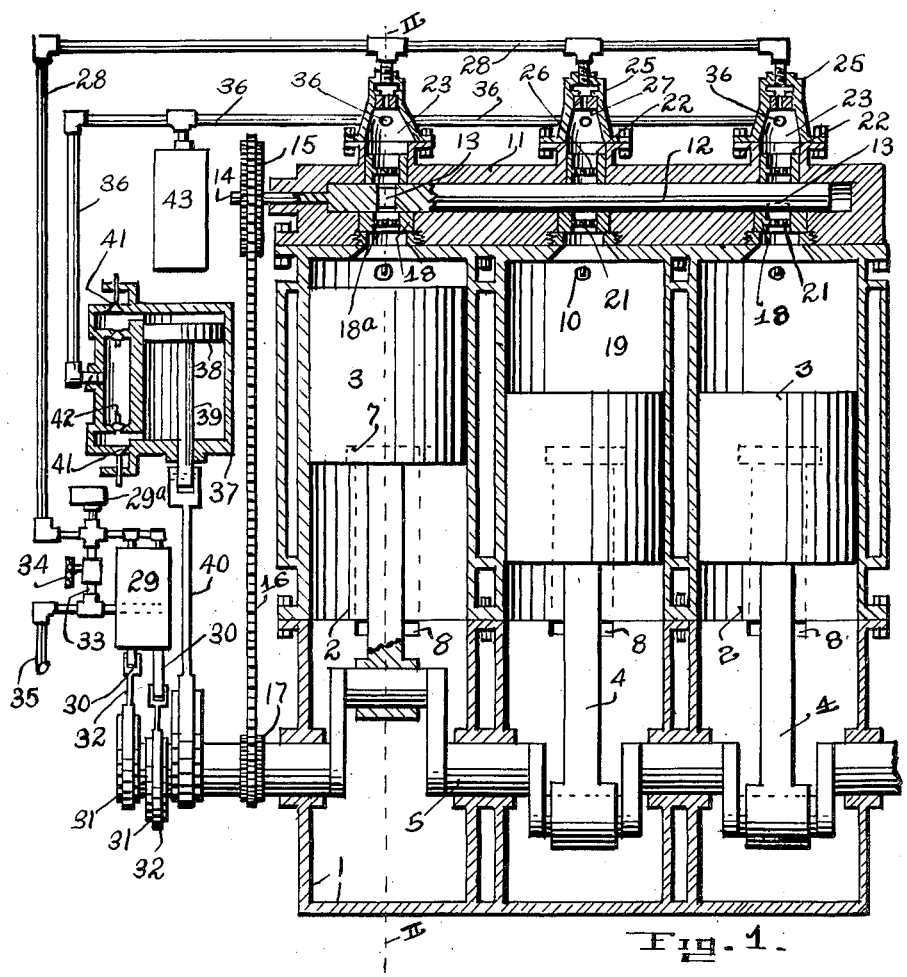
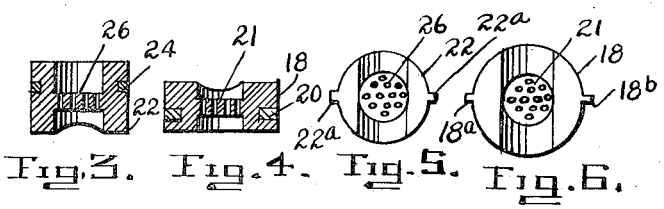
Inventor
Adolph C. Peterson.

Sept. 24, 1940. A. C. PETERSON 2,215,911
FUEL INJECTION AND SPRAYING INTERNAL COMBUSTION ENGINE
Filed Feb. 10, 1937 2 Sheets-Sheet 2

Inventor
Adolphe Peterson.

Patented Sept. 24, 1940

2,215,911

UNITED STATES PATENT OFFICE 2,215,911

FUEL INJECTION AND SPRAYING INTERNAL COMBUSTION ENGINE

Adolphe C. Peterson, Minneapolis, Minn.

Application February 10, 1937, Serial No. 125,005

3 Claims. (Cl. 123—33)

My invention relates to internal combustion engines and particularly to a form of such engines which embodies a particular form of fuel injection and spraying means wherefore it is called fuel injection and spraying internal combustion engine.

The principal objects of my invention are to provide a form of engine embodying injection means which shall be simple and reliable in form and durable in its use and which shall be relatively simple and cheap in manufacture. An object is to provide an injection means for engines which means shall embody air and gaseous fluid for spraying and which shall yet be in the aggregate more simple than the usually used devices for injection of solid liquid fuel to the cylinders of an engine. An object is to provide a form of injection means which shall provide accurate metering of the fuel for each cylinder or combustion chamber and which shall be relatively simple in that metering means so that it will not be unduly complex in form. An object is to provide a form of combination of solid injection with gaseous or air spraying so that effective spraying and atomization will be obtained and therefore a more effective and efficient combustion in the combustion chambers. An object is to provide a form of valve means in connection with such fuel injection and spraying system which shall provide a simple and effective aggregate form. This provision of a specific valve form is not intended, however, to exclude the use of any other well known forms of valve means in connection with the use of my injection and spraying system. An object is to provide in connection a form of revolvable valve means which shall be simple and have provision against leakage. The especial object is to provide for gaseous fluid spraying of solid liquid fuel into combustion chambers by a simple means. In general the object is to provide improved combustion supplying means for engines, thereby providing an improved combustion supplying system which is especially adapted for the simple two cycle form of engine as well as for the four cycle type of engine, or any other type of internal combustion engine.

The principal devices and combinations of devices comprising my invention are as hereinafter described and as defined in the claims. In the accompanying drawings which illustrate my invention like characters refer to like parts throughout the several views.

Referring to the drawings:

Figure 1 is a view chiefly in vertical section on a plane passing vertically through the axis of the crank shaft of the engine, this section being on the line I—I of Figure 2, some parts being in full side elevation.

Figure 8:
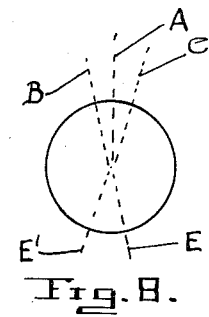
Figure 7:
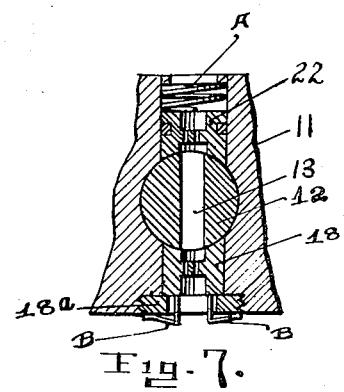
Figure 9:
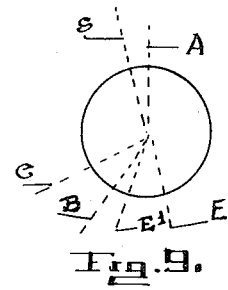

Figure 2 is a section at right angles to that of Figure 1 on the line II—II of Figure 1. Figures 3 and 4 are enlarged detail views in section of the leakage preventing devices and spraying devices used. Figures 5 and 6 are enlarged views looking respectively from the lower side of Figure 3 and from the upper side of Figure 4. Figure 7 is a modified form in detail of the packing blocks. Figures 8 and 9 are diagrams of timing, for high compression or semi-compression ignition engines and low compression or spark ignition engines, respectively.

Referring again to the drawings, the numeral 1 indicates a crank case, 2 the engine cylinders, 3 the engine pistons, 4 the connecting rods, 5 the crank shaft, 6 the exhaust ports in the cylinder side walls, 7 the air inlet ports in the cylinder side walls, 8 the scavenging air passages each individually related to a cylinder and its crank compartment, 9 the third port or air intake port for each individual crank compartment, 10 the spark plugs, all these parts being parts found in and comprising, in so far, what is commonly known as a three-port or third-port type of two cycle internal combustion engine. The parts described constitute the piston and cylinder and the air scavenging and gas exhaust means of a three-port type of two cycle engine. This type of engine is shown for illustration of my fuel providing means for the cylinders, as it is a simple type and as my device is especially preferred for a two cycle type of engine although it is to be understood that any type of four or two cycle engine as commonly used may be used in connection with my device or rather that my device may be adapted for use with any of such types. It is also to be understood that the valve means hereinafter described may be used with other than internal combustion engines and also with other than injection types of internal combustion engine.

The means above described provides the means whereby air is inspirated through each third port 9 for each cylinder, compressed to say five to ten pounds in its crank case compartment, from thence delivered through the related passage 8 and the related air port 7, whenever the associated cylinder exhausts through its exhaust port 6, as the exhaust port and inlet port 7 are uncovered by the engine piston in its cycle of reciprocation.

On the upper ends of the cylinders, there is secured by bolts or otherwise, a head casting or unit 11, which has bored or formed longitudinally of it and horizontally a valve bore wherein there is rotatable a rotary valve 12, the latter having cut transversely through it valve passages or ports 13 one for each cylinder 2 and each so positioned that it is approximately over the central part or lies substantially in the axis of the cylinder extended upwardly. The rotary valve 12 has a shaft 14 extended from it by which it is rotated by sprocket wheel 15, chain 16, and sprocket wheel 17, the latter on crank shaft 5, the relation being such that the rotary valve 12 is revolved once for each two revolutions of the crank shaft 5.

On the under side of the rotary valve 12 just beneath each valve passage 13 (or its location) there is bored vertically in the under side of the head casting or unit 11, a cylindrically formed aperture opening from the valve bore downwardly wherein is mounted so that it has very slight vertical movement but free vertical movement as needed to permit it to bear upwardly against the rotary valve 12, a cylindrical so-called packing block 18. The packing block 18 is stationed approximately between the rotary valve 12 and the combustion chamber 19 of the associated cylinder 2.

The packing blocks 18 each have one or more packing rings 20 which are similar in form to commonly used piston rings or may be of any form adapted to procure a comparatively gastight fit or prevent leakage between the exterior side of the packing block and the apertured wall wherein it is placed. These packing rings will permit the slight movement vertically of the packing block by which it may be pressed against the rotary valve 12. Each packing block 18 has also formed vertically through it an aperture which is oblong in shape in its horizontal plan and longer in the direction parallel to the axis of rotary valve 12 than the width in the direction transversely of the rotary valve 12. In the aperture thus formed in each packing block there is placed a grid 21 which latter constitutes a spraying grid having a plurality of small apertures in it by which there may be passage downwardly through the packing block to the combustion chamber 19 to which it is related.

On the upper side of the rotary valve 12 just above each valve passage 13 (or its location) there is bored vertically in the upper side of the head casting or unit 11, a cylindrically formed opening from the valve bore upwardly. Therein is mounted so that it has very slight vertical movement but free vertical movement as needed to permit to bear downwardly against the rotary valve 12, a cylindrical so-called packing block 22 which is stationed approximately between the rotary valve 12 and a spray chamber 23 formed above it in an individual spray chamber unit 25, the latter secured by bolts on the head casting 11 above the rotary valve bore. There is one spray unit 25 for each valve passage 13.

Each packing block 22 has one or more packing rings 24 about it which provide a gas leak proof fit but permit slight movement of the packing block 22 downwardly against the rotary valve 12. Each packing block 22 has also formed vertically in it an aperture which is oblong in shape in its horizontal plan and longer in the direction parallel to the axis of the rotary valve than in the direction transversely of the valve, and in this aperture (of each packing block 22) there is placed a grid 26 which latter constitutes a spraying grid having a plurality of small apertures in it by which there is or may be passage downwardly through the packing block to the passage 13 related to the rotary valve 12 whenever that passage is turned to permit passage through it, to the grid 21 beneath the passage and thereby to the combustion chamber of the related cylinder 2.

Each spray chamber unit 25 has placed in its upward end a metering nozzle 27 which is screwed or wedged into its place and has a nozzle or aperture through it which is of a metered or carefully measured cross-section and is of a predetermined capacity, that is a predetermined flow-capacity during a measured interval of time at a measured pressure of liquid or fuel passing through it. Thus each spray chamber unit 25 has such a metered capacity metering nozzle 27 and each of these nozzles 27 is of exactly the same capacity at equal pressures and during equal periods of time. Liquid fuel is delivered to each of these metering nozzles 27, that is to the metering nozzles of all the spray chamber units 25 from a common pressure supply conduit 28, and the latter receives liquid fuel under pressure from a pressure fuel supply pump 29, a small pressure equalizing reservoir 29a providing accurate equalization of the pressure. The pumps 29 are reciprocating pumps whose plungers 30 are reciprocated by eccentrics 31 and rods 32, and a by-pass 33 governed by hand valve 34 permits of by-passing fuel as pumped to the supply pipe 35, thus providing for control of the quantity of delivery of the pumps 29. There should be several of the plungers 30 so as to provide as nearly an equalized pressure of flow as possible to the metering nozzles 27.

Each spray chamber unit has delivery to its spray chamber 23 by a common conduit 36 of air or other gas or vaporized fluid in a gaseous form provided by any means, but is shown to be provided with air under high compression supplied by a double acting air compressor 37 whose piston 38 is reciprocated by rod 39 and eccentric 40 on crank shaft 5. The compressor has suction air valves 41 and delivery valves 42 and a reservoir 43 provides for equalization of the pressure flow as may be necessary. The flow to each spray chamber 23 is unrestricted except as permitted by the pressure within the spray chamber 23. (It is to be noted especially that any other means of supply of a gaseous fluid by a common conduit or means to the spray chambers 23 may be provided and that the supply of gaseous fluid may be of an inert gas or vapor under high gaseous tension.) The pressure of the air flow from compressor 37 is or may be any pressure depending on the cycle on which the engine operates, such as compression ignition or spark ignition or otherwise, and depending also on the specific period of the cycle at which fuel introduction occurs, but that pressure of air flow is preferably as much as five hundred pounds or more so that the spray and injection may be under high compression. The supply of fuel to the metering nozzles 27 is also preferably at a high pressure of say eight hundred pounds or more so that there may be highly efficient atomization and spraying. The gas and fuel pressures may be low, say twenty pounds for the gaseous fluid and thirty pounds for the fuel, if it is desired that the fuel delivery be during an early part of the compression strokes of the pistons.

This fuel spraying and distribution device is contemplated to be a device applicable to internal combustion engines of the relatively low pressure type where the fuel and air charges may mix prior to combustion, as well as to the higher compression types of engine where the mixture of the fuel charges with the main air charge should not occur until approximately at the moment combustion should commence, that is approximately at the moment of maximum precompression of the charge.

In the event that the device is applied to an engine of the low compression type, the air for spraying may be delivered at a relatively low pressure as compared with the maximum pressures in the engine cylinders, and the fuel delivery pressure for injection to the spray chambers may be correspondingly low, since in the case of the low pressure types of engine the rotary valve 12 (or the valve means provided) may be so rotated or timed as compared with the rotation of the engine crank shaft that the delivery of charges would occur in the early part of the compression strokes of pistons, and in that case the spray chambers and valve 12 may be located otherwise, that is at the sides of the engine cylinders, where the engine pistons, may on further compression in the cylinder obstruct the passage from the spray chamber through an associated port 13. This location of the transfer ports so as to be covered or uncovered by the engine piston in low compression engines is commonly known and may be in that commonly known manner so that it is therefore not specifically illustrated as such.

In the event that the device is applied to an engine of the high compression type, and this is the preferred application, then the fuel injection must occur at a time in each cylinder working cycle which is approximately just at the moment of maximum compression or just before that moment, in order that preignition will not occur. In order that injection of the fuel from the spray chamber 23 will occur to a cylinder under such conditions, the air for spraying supplied to the spray chambers must be at a pressure of as much as say five hundred pounds or more and the fuel delivery to the spray chambers should be preferably considerably above that pressure say eight hundred pounds or more. These pressures would depend on the maximum pressures attained under combustion in the engine cylinders, according to their design, and if in excess of the maximum compression pressure prior to ignition there will always be some injection of fuel. The fuel pressures would vary slightly according to the quantity of fuel delivery, that is according to the load at any time, but the capacity of the air and fuel pumps should be such as to accomplish the objectives. The air and fuel pressures for distribution of air and fuel to spray chambers 23 are designed to be such, for the high compression type of engine, that fuel distribution will occur as necessary to the spray chambers and from thence to the working cylinders of the engine, and are designed to be such and the ports through the grids of the packing blocks are designed to be such that this injection will occur at a relatively very rapid rate so that this speed of injection will, as the fuel passes through the grid-type of passages, prevent back firing to the spray chambers and also prevent backward flow. In the high compression injection type of engine the ports 13 of the rotary valve 12 will be open to each engine cylinder a brief interval as compared with the entire compression and working stroke, and thus back-firing and backward flow will be prevented. The pressures of delivery to the spray chambers must however be so great that not only will backward flow be prevented but that injection to the extent necessary according to the load will, unfailingly, be effected. The quantity of air delivery to the spray chambers 23 will be relatively low as compared with the quantity of fuel sprayed therein and this relatively high percentage of fuel in the spray chambers, especially at the period of injection, will at all times aid in preventing any back-fire to such spray chambers 23. The high pressures and high speed of injection, in a high compression engine, will, in combination with the high percentage of fuel in the injected fluid, serve to positively prevent back-fire to the spray chambers. The grids through which the flow occurs are of such relative metal surface and metal content, in association with the grid apertures, each of which is very small in cross-section, that if at any moment a slight backward-flow tendency should occur this metal content will abstract heat and prevent back-fire by extinguishing flame. It is contemplated, however, that such backward flow and back-fire cannot occur at any time in normal operation and use since there must always be a flow, very rapidly, towards the engine working cylinder and not from the working cylinder in order to procure injection and working action in the engine cylinders.

The ports 13 in the rotary valve 12 are in the construction for a high compression engine so narrow transversely of the valve that the port 13 associated with any engine cylinder will be open only for say a twenty degrees period approximately when the engine piston rises to its maximum inward or compression position, and this brief opening for a high compression engine procures a very rapid transfer of fluid, and yet procures injection of a sufficient quantity of air and fuel for spraying because of the comparatively long length of the port 13 in the direction of the axis of the rotary valve 12. These comparative dimensions must be carefully proportioned for each particular engine construction to ensure the operation in the manner indicated during injection periods. The actual time period of opening of any port 13 to an engine cylinder will of course vary with the engine speed but any particular engine construction will have a normal range of speed for operation and within that range the pressures of air and fuel delivery to the spray chambers will vary somewhat with the engine speed, but these pressures with increasing speed will increase in a degree sufficiently to procure the injection indicated, during this normal range of speed. At the higher pressures and speeds a somewhat lesser proportionate air compression delivery will automatically occur, since that is the normal action of air compressors at high pressures, and accordingly at the higher speeds and pressures there will be a somewhat less delivery of air to the spray chambers in proportion to the fuel delivery and this circumstance will contribute to maintaining the normal injection action although it will not affect the injection of fuel in any manner to obstruct that delivery to the engine cylinders, as the delivery of fuel to the spray chambers 23 will tend to be unaffected by the speed, the liquid fuel being relatively incompressible and accordingly also relatively inexpansible. It is contemplated that passage of the air for spraying to the spray chambers 23 from the air compressor will sufficiently cool this spray air in that passage to avoid any tendency toward heating of the air to the ignition point of fuel and such cooling of spray air will accordingly also assist in maintaining the contents of the spray chambers at a sufficiently low temperature to avoid any ignition therein of the fluids passing therethrough, but if any additional cooling of the spray air or liquid fuel passing to the spray chambers 23 is found necessary to procure the objectives indicated any such cooling means may be provided in addition to the cooling provided by the delivery conduits. These conduits should be so placed that they are not heated unduly, but rather cooled, in passage of the fluids therethrough. Such cooling facility is a matter for contemplation in any particular engine construction according to its size and its use.

It is not contemplated that the fuel distribution means shown will be used for a low compression engine with low pressures in the spray air and fuel lines without adaptation of the engine construction especially for that type of construction. As illustrated the engine is contemplated to be designed as a high compression engine (with or without spark ignition) as the fuel devices are especially advantageous for such high compression engines, although such preferential use does not exclude the use of the device for low compression engines and in the manner best suited for such low compression engines.

The packing blocks 18 are each held in place by screw caps 18a screwed into the under side of the head casting 11, the screw caps 18a being apertured as shown to permit passing of the sprayed mixture through them. The packing blocks 22 with their grids are of such weight and so freely slidable in their mountings that they will normally slide downwardly and upon or against the upper side of the rotary valve 12, and be pressed by the pressure of the mixtures in the spray chambers 23 downwardly upon the valve 12, in operation under pressures in the spray chambers 23, but this pressure will not be great as the central part of the packing block is apertured by the grid apertures. However this pressure will be sufficient to maintain the packing blocks on the upper side of the valve in close association with the valve 12 in revolution of the latter. The packing blocks 22 have their under faces ground into the shape of a sector of a cylinder so as to properly contact the cylindrical face of the rotary valve 12, and they each have one or two teeth or lugs 22a fitting in vertical grooves in the interior face of the cylinders within which they slide so as to hold them against rotation on their own axes. Likewise the packing blocks 18 have their upper faces ground into the shape of a sector of a cylinder so that they will more fully contact the rotary valve 12 on the latter's under side, and they each have one or two teeth or lugs 18b which will fit in vertical grooves in their cylindrical mountings so as to prevent them from rotation on their own vertical axes.

In the use or operation of my device, it is contemplated that any form of starting means will be used to start the crank shaft 5 as is commonly done with internal combustion engines, and being so started the reciprocation of the engine pistons will cause air to be inspirated into the crank compartments (which are separate) and this air is compressed to about five to ten pounds, and then the related cylinder combustion chamber is scavenged by this air as the cylinder chamber exhausts. The combustion chamber of the cylinder will then be charged with atomized and sprayed fuel and this charging with fuel will occur at some time during the compression stroke after the side wall ports are closed or at approximately the period of maximum compression in the cylinder 2, this time or period of injection depending on whether the engine is constructed to operate on a compression ignition, a semi-compression ignition, or a spark or other type independent ignition means. If the injection is made to occur early in the compression stroke then the spark plugs will have their sparking periods (produced by any current supply and timing means as commonly used) timed to occur at or near the period of maximum compression. If the injection is made to occur at or near maximum compression then compression ignition may be used, or spark ignition may be used as supplemental ignition to make ignition more certain in an engine, say, where the compression pressures may be high but not so high as to positively or unfailingly produce ignition.

Injection and spraying of the fuel will occur as the rotary valve 12 places its passage 13 related to a cylinder, in communication with the grids above and below it in the packing blocks 22 and 18, respectively. When this communication occurs, the fuel that has been deposited in the spray chamber and is being deposited therein will during the injection period be blown by the flow of air under high pressure through the related grids 26 and thereafter through the related grid 21 and this blowing of the fuel through the two grids 26 and 21 in succession results in further atomization and spraying of the fuel into the combustion chamber 19 of the cylinder 2 so that the fuel is highly atomized as it enters the combustion chamber of the cylinder 2. Each spray chamber 23 is constantly being supplied with liquid fuel atomized as it is emitted from the metering nozzle under high pressure, and this atomization from the nozzle 27 is continuous without interruption, but the injection and spraying into the cylinder 2 with the air from the common conduit 36 occurs only during the period of injection determined by the rotation of the valve 12 and the period of communication the passage 13 is constructed to provide. This period may be a period of say twenty or more degrees, preferably about twenty degrees if a compression ignition cycle is used, or say from thirty to forty degrees if a different cycle is used. The grids 21 and 26 will tend to prevent any backfire into the spray chamber 23 but this will also be prevented by the rapidity of the action, as hereinabove explained, especially if the period be limited to say twenty degrees or thereabouts. The grid size and the apertures will be correspondingly small if a very high pressure of injection be used, but it should be noted that the grid apertures from any spray chamber should in any construction be sufficiently large in cross section, in the aggregate, to permit of speedy charge transfer, during the injection period provided for.

The pressure of air and fuel in chamber 23 tends to keep packing block 22 in close contact, and the pressure of combustion during combustion periods in the cylinder 2 will tend to keep packing block 18 in close contact upwardly against rotary valve 12. The area of the circumferential ring of the packing blocks will provide this area for effect of the pressure.

The packing blocks are generally cylindrical in form horizontally and these packing blocks can thus render good gas fit between them and their associated wall in the head casting whereby they slide. And each upper packing block 22 has a cylindrical sector shaped lower face abutting against the upper side of the valve 12, and likewise the lower packing blocks 18 have a cylindrical shaped sector face in their upper face which permits of good contact upwardly against the lower side of valve 12. The valve 12 should be of a hard metal and the packing blocks may be of a somewhat softer metal and may be graphite impregnated to provide some lubrication but it is contemplated that some form of efficient pressure lubrication of the valve 12 will be provided this being contemplated, but omitted for simplicity in the drawings and clearness in the illustration of the essential invention.

As shown dependence is given to the fluid pressures and also the weight of the packing blocks 22 to keep all packing blocks in close contact with the valve 12 but any spring or other yieldable means may be utilized for this purpose in addition to the means shown. The packing blocks 18 are shown as held relatively close to the valve 12 but this is not so close as to prevent free revolution of valve 12 and the packing blocks 18 may be held in closer contact by the pressure of gases in the combustion chamber 19 when that occurs.

The atomizing nozzles are made of a hard and resistive metal as an alloy steel and the atomization or metering aperture of each nozzle 27 is made of exactly the same size or cross section as each of the others and this exact and equal character is obtained by use of the most accurate tools obtainable in manufacture of such nozzles 27, and also by using of the most suitable material for the nozzle containing the aperture, whatever such material may be or become available therefor. This exact and equal character of the metering apertures of the nozzles 27 is essential to the efficient operation of the device as the equal distribution of the liquid fuel under pressure is dependent on this exact and equal size of the metering apertures 27a. The emission from these apertures is constant and never interrupted but the amount of liquid flowing through them will always depend on the pressure of delivery of the liquid fuel to the common delivery conduit. Thus the amount of fuel delivered to each cylinder always depends on the pressure in the common fuel conduit. This pressure is determined by the fuel pumps as controlled by the hand controlled by-pass valve.

The atomized fuel from the metering nozzles in each spray chamber will fall to the lower part of the spray chamber and also to a partial extent be suspended in the spray chamber in the atomized or semi-gaseous form, and as gaseous fluid or air flows through the spray chamber 23 this will carry the liquid fuel, and the suspended fuel, such as there may be of suspended fuel, through the small or minute apertures of the grids and thereby cause further atomization. The apertures of each of the grids or pairs of grids of each cylinder should be also as nearly equal as is possible but the distribution of fuel is dependent on the metering nozzles 27. The grids or their apertures are considerably larger than the metering apertures 27a in total cross-sectional area of apertures so as to freely permit flow of the gas and fuel, although they must not be of any larger cross-sectional area than to result in rapid passage of the injected fuel and gas.

It should be especially observed that the equal distribution of fuel in this device depends for its effectiveness and is solely dependent upon the accuracy of size of the metering apertures in the nozzles 27 and that these equal apertures, one for each cylinder, are supplied by a common conduit 28 which has passages of such sufficient size by comparison with the metering apertures of nozzles 27 that such an equal distribution through the metering nozzles is not interfered with but is facilitated. In other words there is such a sufficient quantity of fuel in the common conduit 28 that a substantially perfect equalization of pressure upon all the metering apertures in nozzles 27 is at all times maintained not withstanding that that common pressure may increase or decrease in accordance with an increase or diminishment of the rate of supply by the fuel pumps to the common conduit 28. The common conduit 28 is supplied by the pumps 29 with the cooperation of the small equalizing reservoir 29a with liquid fuel at a pressure which does not vary except as the rate of supply varies up or down with increasing speed of the pumps 29 or opening or partial closing of the valve 34 to vary the power output. Since the pressure in common conduit 28 is perfectly equalized, through the ease of distribution in common conduit 28, at the points of delivery to the metering nozzles 27 and there is no restriction upon delivery through nozzles 27, except their equal area, this flow is constant and perfectly equal through the nozzles 27 for any particular power output and speed of the engine, and this flow never ceases or changes during the engine cycle nor does the performance in any cylinder vary from that of the others in the cycle.

The flow through any passage 13 to any cylinder is in any type of engine construction limited to a period such that the pressure in the chamber 23 is always higher than the pressure in the engine cylinder during the period of time that the passage 13 associated is open to the cylinder. This is accomplished by so constructing the air and fuel supply pumps 37 and 29, respectively, and so timing the opening of the passages 13 with respect to compression in the cylinder, that the pressure in the cylinder during such period is less than the injection pressure from the associated chamber 23.

Figure 8 shows the relative timing in a high compression or a semi-compression engine where ignition may be effected, during normal operation, by the heat of compression. In this figure A is the period of maximum compression of the air charge in the engine cylinder, B—C is the period of delivery of the fuel charge through the passage 13 associated, A to E is the period of combustion and working stroke, E to E1 is the period of air scavenging, E1 to A the period of air compression in the cylinder.

Figure 9 shows the relative timing in a low compression or spark ignition type of engine. In this figure A is the period of maximum compression of the air charge in the engine cylinder, B—C is the period of delivery of the fuel charge through the passage 13 associated, A to E is the period of combustion and working stroke, E to E1 is the period of air scavenging, E1 to A is the period of air compression in the cylinder. S is the spark time.

When the timing shown in Figure 8 is adopted the pressures of air and fuel supply to chambers 23 must be high, say over five hundred pounds for the air supply, and as much as or more than eight hundred pounds for the liquid fuel supply. When the timing shown in Figure 9 is adopted, the pressures of air and fuel supply to chambers 23 need not be high, and such pressures may be then as low as say twenty to fifty pounds for the air supply and say fifty to a hundred pounds more or less for the liquid fuel supply. Such pressures in either case would be in excess of the pressure in the engine cylinder during the period of opening of the passage 13 associated with the cylinder. But in this case, the nearer the injection period is to the period of maximum cylinder compression, the higher must be the air and fuel pressures delivered to the spray chambers 23.

Figure 7 shows a modified form of packing block assembly wherein yieldable springs A and B assist in maintaining the contact with valve 12.

While I have shown particular devices and combinations in the illustration of my invention, I contemplate that other detailed devices and combinations of devices may be used in the realization of my invention, without departing from the spirit and contemplation thereof.

I claim:

1. In a multiple cylinder internal combustion engine in combination a plurality of cylinders, a combustion chamber for each cylinder, a spray chamber associated with each combustion chamber and in restricted communication therewith, a common constant pressure fuel supply rail having continuously open branch lines leading into each spray chamber, an element located between each branch line of said fuel supply rail and corresponding spray chamber, having an orifice of predetermined area to give a predetermined fuel supply, a common constant pressure atomizing fluid supply rail having continuously open branch lines leading into each spray chamber between said element and said restricted communication, the pressure in said fluid rail being less than the pressure in said fuel rail, and valve means located in said restricted communication for periodically establishing communication between a spray chamber and its associated combustion chamber during a predetermined period of the engine cycle.

2. In a multiple cylinder internal combustion engine in combination a plurality of cylinders, a combustion chamber for each cylinder, a spray chamber associated with each combustion chamber and in restricted communication therewith, a common constant pressure fuel supply rail having continuously open branch lines leading into each spray chamber, an element located between each branch line of said fuel supply rail and corresponding spray chamber, having an orifice of predetermined area to provide a predetermined flow capacity, a common constant pressure atomizing fluid supply rail having continuously open branch lines leading into each spray chamber between said element and said restricted communication, the pressure in said fluid rail being less than the pressure in said fuel rail, and valve means located in said restricted communication for periodically establishing communication between a spray chamber and its associated combustion chamber during a predetermined period of the engine cycle.

3. In a multiple cylinder internal combustion engine in combination a plurality of cylinders, a combustion chamber for each cylinder, a spray chamber associated with each combustion chamber and in restricted communication therewith, a common constant pressure fuel supply rail having continuously open branch lines leading into each spray chamber, an element located between each branch line of said fuel supply rail and corresponding spray chamber, having an orifice of predetermined area the orifices delivering fuel to the spray chambers being equal in area, a common constant pressure atomizing fluid supply rail having continuously open branch lines leading into each spray chamber between said element and said restricted communication, the pressure in said fluid rail being less than the pressure in said fuel rail, and valve means located in said restricted communication for periodically establishing communication between a spray chamber and its associated combustion chamber during a predetermined period of the engine cycle.

ADOLPHE C. PETERSON.